Sept. 10, 1968  S. S. CARLTON ET AL  3,401,114
PROCESS USING COAL IN SEWAGE TREATMENT
Filed Oct. 15, 1965

INVENTORS
STUART S. CARLTON
BERTRAM C. RAYNES
BY Ernest S. Cohen
M. Howard Silverman

ATTORNEYS

United States Patent Office 3,401,114
Patented Sept. 10, 1968

3,401,114
PROCESS USING COAL IN SEWAGE TREATMENT
Stuart S. Carlton, Parma, and Bertram C. Raynes, Pepper Pike Village, Ohio, assignors, by direct and mesne assignments, of one-half to Rand Development Corporation, Cleveland Ohio, and one-half to the United States of America as represented by the Secretary of the Interior, jointly
Filed Oct. 15, 1965, Ser. No. 496,730
14 Claims. (Cl. 210—30)

ABSTRACT OF THE DISCLOSURE

Raw sewage is passed through a bed of coal to filter out solids and adsorb soluble contaminants. As filtered-out solids collect at the surface of the bed to coat the coal and thereby inhibit flow of additional sewage through the bed, the top layer of the bed is removed.

---

Figure 1:
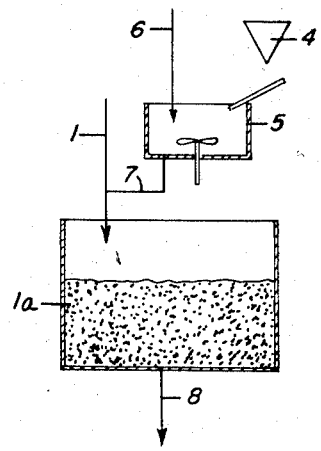

The invention relates to the purification of raw sewage.

The phrase "raw sewage," as used in the specification and claims, includes municipal waste waters originating from domestic or industrial sources, or both, or a combination of either or both with storm waters which are also collected by the sewers serving the municipality; wastes originating from specific industries including, but not restricted to, abattoirs, oil refineries, breweries and chemical and manufacturing plants; and other sources of waters which contain impurities of types desired to be removed and capable of removal by the process of this invention.

Pollution of the nation's water supplies by contaminants present in sewage is becoming an increasingly acute problem. At present, conventional sewage treatment plants are incapable of removing a large percentage of all the pollutants present in sewage. As a result these pollutants have been returned to the nation's water supplies thereby lowering their quality as evidenced by foaming, taste and odor problems. Aside from aesthetic considerations, increasing concern is rising over the possible long term effects of these pollutants on health.

Soluble compounds within raw sewage comprise the potentially hazardous materials. They include:

(a) phosphates;
(b) COD- and BOD-producing materials (chemical and biochemical oxygen demand materials that help consume oxygen from water);
(c) alkyl benzene sulfonate (ABS) synthetic detergent which is poisonous to plants and animals, causes foaming, and is a COD- and BOD-producing material;
(d) linear alkyl sulfonate (LAS) biodegradable detergents;
(e) dyes;
(f) complex metals ions such as multivalent tungsten and chromium (products of metallurgical-type industry);
(g) organic cyanides (products of metallurgical-type industry);
(h) nitrogen-containing organic matter from human and industrial wastes.

Present raw sewage treatment systems are capable of removing substantial portions of the suspended matter and other solids, but cannot remove a large percentage of the soluble contaminants, removal of ABS and phosphates being especially poor. In fact, present soluble contaminant removal processes result in the formation of soluble nitrates which, together with phosphates, stimulate destructive algae growths in bodies of water which receive the treated effluents.

The object of this invention is to provide a new, efficient, economical raw sewage treating process for removing from the sewage a large percentage of the suspended matter and soluble compounds present therein, without the formation of deleterious nitrates.

A further object of the invention is to provide a sewage filtering process wherein a consistently high rate of flow of sewage through the filter bed is maintained without the need for backwashing of the filter medium to remove filtered solids therefrom.

It has now been discovered that suspended matter and other solids and soluble organic compounds may be removed from raw sewage by contacting the raw sewage with coal. The coal acts as a filter for the suspended matter and other undissolved solids and it acts as an adsorbent for the soluble pollutants.

Further objects and advantages will be had from the following description of the process.

Raw sewage can be brought into direct contact with coal by any of the known solid-liquid contacting expedients suitable for filtration and adsorption.

One particular advantageous contacting step as shown in FIG. 1 involves the percolation of a stream of raw sewage 1 through a bed of particulate coal 1–a in which suspended matter and other undissolved solids are filtered out of the liquid, and dissolved pollutants are adsorbed by the coal. Alternatively, some particulate coal can be admixed into raw sewage in mixer 4, the coal and sewage supplied to the mixer by hopper 5, and conduit 6, respectively. The mixture can then be passed to the coal bed 1–a via conduit 7. In any case, clear effluent passes from the bed by way of conduit 8.

Figure 2:
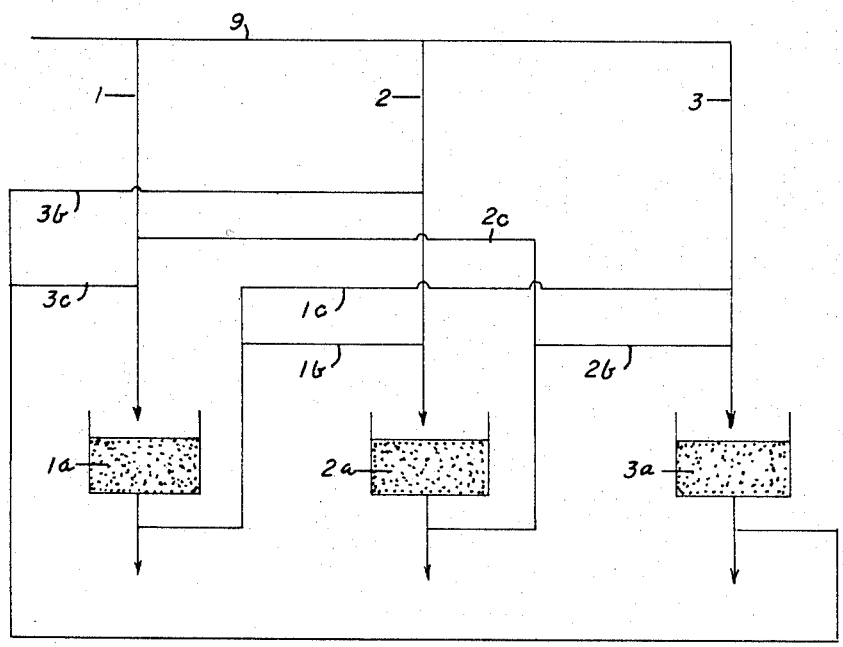

A plural stage contacting system as shown in FIG. 2 is also advantageous for the purposes of this invention. Raw sewage from a sewage supply line 9 passes through conduit 1 first to a bed of coal 1–a which has previously exhausted its adsorptive capacity, the bed thereby functioning only as a filter medium. The thus treated sewage is then passed through conduit 1–b or 1–c to a fresh bed of coal 2–a or 3–a, respectively, which acts as an adsorbent for dissolved compounds. When the latter bed 2–a or 3–a has exhausted its adsorptive capacity it can be converted to the preliminary treatment filter bed by suitable piping 2 or 3, respectively, and valving (not shown), in which case another bed of fresh coal can be established as new adsorbent in that bed which was inoperative during the immediately preceding operation. Conduits 3–c and 3–b enable bed 3–a to be connected to beds 1–a and 2–a, respectively. Conduits 2–b and 2–c enabled bed 2–a to be connected to beds 3–a and 1–a, respectively. Under this arrangement a continuous process is assured wherein two of the three beds function together during treatment and the third bed is loaded with fresh coal to function as the adsorbent in the next cycle.

Figure 3:
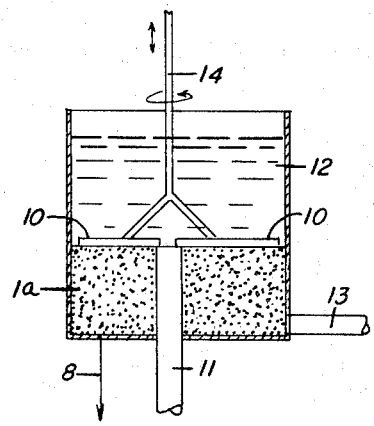

A consistently high rate of flow can be maintained through a filter bed or filter-adsorption bed without a need for backwashing the filter medium to remove filtered-out sewage solids that obstruct flow. This is accomplished by the continuous withdrawal, as by scraping, pumping or otherwise, of the surface layer of the bed containing the filtered-out sewage solids and coals coated with the same, thereby continually reforming a surface layer of uncoated coal particles. As shown in FIG. 3, motor driven blades 10 may be used to scrape the surface layer of bed 1–a, the resulting scraped portions being removed through conduit 11 from the area between the bed 1–a and raw sewage 12. Fresh coal particles can then be added to the bed through conduit 13 to compensate for undesirable reductions in coal bed height, or the drive shaft 14 for blades 10 may be longitudinally movable to compensate for such bed thickness variations. The filter bed surface need not be circular shaped since other geometrical shapes are appropriate. Furthermore, the scraper blade need not be restricted to the rotary type, since a reciprocating blade that moves back and forth across the bed surface would function adequately for the purposes of the invention.

Regular commercial coals such as sub-bituminous, low volatile bituminous, medium volatile bituminous and high volatile bituminous are effective for the purposes of this invention. Anthracite and lignite are inefficient for raw sewage treatment.

Particulate coals with particle sizes of −20 to +250 mesh are effective for the purposes of this invention. Coal particles outside this range may also be used, but at a reduced operational efficiency.

Process variables depend upon such matters as (1) the particular coal utilized, (2) coal particle size, (3) the particular raw sewage being treated, (4) the required product quality and (5) the particular contact expedient being employed. Room temperature and atmospheric pressure are adequate for the purposes of the invention. Further, there is no need for temperature control in the process except to prevent freezing. A bed thickness from 2 inches to 25 feet or more may be used in the process. For example, a 6-inch bed will provide effective filtration but minimal adsorption. A 12-inch or more bed is generally required for effective adsorption. As to flow rates, filtration and adsorption may be accomplished with flow rates up to 400 gallons per square foot of bed per hour. A simple pressure developed by a head of 1 to 10 feet of liquid above the coal bed will achieve desirable flow rates.

Consumption of new coal in the process is a function of the quantity of sewage being treated and the degree of product purification desired, rather than of apparatus configuration or of using the option of admixing a portion of the coal into the raw sewage stream as described above. In the case of waters which are only slightly contaminated, or where the flow rate may be low, consumption of new coal may be as low as one ton or less per million gallons of raw sewage. Where high levels of contamination are encountered or where high flow rates must be accommodated, quantities of as high as ten tons or more per million gallons of sewage may be required.

The process is capable of removing 90–100% of the suspended matter and other undissolved solids from raw sewage, and producing a clear effluent in which BOD has been diminished 60–90%, COD has been diminished 60–90%, phosphates have been diminished 60–100% and ABS has been diminished 80–95%. The following examples indicate the effectiveness of the process:

Example 1

A filter bed was prepared of high volatile-A bituminous coal, crushed and sized to −60 to +100 mesh, and loaded into a 48-inch diameter filter bed to an effective height of 18 inches. Raw municipal sewage, having had no pretreatment except comminution to reduce the size of large solids, was passed through this filter at a flow rate of 21.6 gallons per square foot per hour. Additional coal of the same size and rank was admixed into the filter feed at a rate of one pound per 4700 gallons. The filter surface including admixed coal, a portion of the filter bed, and accumulated sewage solids was continuously removed at the rate of 1/6 inch per hour, for a total coal consumption of 2 tons per million gallons. The effluent was clear, with the following measured reductions in impurity content between the raw sewage and final effluent:

|  | Percent |
|---|---|
| COD | 72 |
| BOD | 68 |
| Suspended matter and other undissolved solids | 93.2 |

Example 2

A filter bed was prepared and operated as in Example 1, except that no coal was admixed into the raw sewage. The clear filtrate was then passed through a bed of high volatile bituminous-C coal eleven feet deep, at a rate of 30 gallons per square foot per hour. The following reductions in impurity content were observed between the raw sewage and the final effluent:

|  | Percent |
|---|---|
| COD | 80 |
| BOD | 88 |
| ABS | 84 |
| Suspended matter and other undissolved solids | 95 |
| Phosphorus | 73 |

Example 3

A quantity of odorous and highly colored meat-packing plant waste was passed at a rate of approximately 15 gallons per square foot per hour through an 18-inch bed of high volatile bituminous-A coal in a size range of −10 to +20 mesh. The filtrate was clear, odorless and contained a reduction of 89% COD from an original value of 2280 p.p.m.

Spent removed coal, after being dried, may be immediately burned to generate useful power and dispose of the contaminants. Thus the many tedious time-consuming and expensive steps of digestion, elutriation, chemical conditioning, and vacuum filtration associated with existing sewage treatment processes may be eliminated.

Except for the purpose of protecting the system from damage by exceptionally large or uncommon types of solid matter such as rocks, logs, large pieces of cloth, or other materials of this type which it may be desired either to remove by the use of screens or gratings, or to reduce in size by grinding or shredding, no pretreatment of the sewage is required prior to its introduction into the filtration-adsorption bed. The conventional steps of removing grit (sand, cinders, silt) and primary sedimentation to remove a portion of suspended organic matter are thus avoided. Undesirable nitrate formation, which results from conventional treatment, is also avoided.

Thus, the process of the present invention creates a new coal market, provides a new, efficient, economical treatment for raw sewage, thereby affording cleaner water supplies, and provides for economical and more effective disposal of the pollutants.

While the particular process herein described is well adapted to carry out the objects of the pesent invention, it is to be understood that various modifications and changes may be made all coming within the scope of the following claims.

What is claimed is:
1. A method for treating raw sewage containing insoluble phosphates, suspended matter, other undissolved solids, and soluble compounds comprising
  (a) filtering said sewage through a compact mass of particulate coal, said coal selected from the group consisting of sub-bituminous, low volatile bituminous, medium volatile bituminous and high volatile bituminous to filter out said insoluble phosphates, suspended matter and other undissolved solids, whereby solid sewage materials and soluble compounds coat the coal at the surface layer of the mass through which the sewage initially enters said mass;
  (b) removing said surface layer of the mass which contains filtered-out sewage solids, and leaving in place the portion of the mass beneath the surface layer as said filtered-out sewage solids accumulate and inhibit flow of liquid into and through the mass, thereby continuously maintaining a surface layer of coal substantially uncoated with sewage solids; and
  (c) removing clear effluent from the coal mass.
2. The method of claim 1 wherein said soluble compounds include COD-producing material.
3. The method of claim 1 wherein the particle size of the coal is −20 to +250 mesh.

4. The method of claim 1 wherein said soluble compounds include BOD-producing material.

5. The method of claim 1 further comprising burning said removed coal to dispose of adsorbed contaminants and filtered-out solids.

6. The method of claim 1 wherein said soluble compounds are selected from the group consisting of ABS, LAS, soluble phosphates, dyes, complex metal ions, organic cyanides, and nitrogen-containing organic wastes.

7. The method of claim 1 wherein particulate coal selected from the group consisting of sub-bituminous, low volatile bituminous, medium volatile bituminous and high volatile bituminous is added to said raw sewage prior to contacting said sewage with said contact mass.

8. The method of claim 1 wherein said surface layer is removed by backwashing.

9. The method of claim 8 wherein said soluble compounds are selected from the group consisting of ABS, LAS, soluble phosphates, dyes, complex metal ions, organic cyanides, and nitrogen-containing organic wastes.

10. A method for treating raw sewage containing insoluble phosphates, suspended matter, other undissolved solids, and soluble compounds comprising passing said raw sewage rapidly through a first bed of particulate coal to filter out said insoluble phosphates, suspended matter and other undissolved solids on the surface layer of said bed, whereby coal particles in said layer become coated with sewage solids, removing a first filter effluent, passing the first filter effluent through a second bed of particulate coal to adsorb said soluble compounds on the coal and removing a clear first adsorbent effluent, continuing the passage of first filter effluent through said second bed until the adsorption capacity of said second bed is depleted, then passing raw sewage rapidly through the second bed whereby said second bed acts only as a filter bed, and removing second filter effluent, passing said second filter effluent through a fresh bed of particulate coal to adsorb said soluble compounds and removing second adsorbent effluent from said fresh bed; said coal in said first and second beds being selected from the group consisting of sub-bituminous, low volatile bituminous, medium volatile bituminous and high volatile bituminous.

11. The method of claim 10 wherein said soluble compounds include COD-producing material.

12. The method of claim 10 wherein said soluble compounds include BOD-producing material.

13. The method of claim 10 wherein raw sewage is continuously treated by utilizing each depleted adsorbent bed as a new filter bed, and establishing another fresh coal bed as a new adsorbent bed for effluent from each new filter bed.

14. The method of claim 13 wherein three beds of coal are incorporated in the continuous operation, and while two of the three beds are functioning as a filter bed and an adsorption bed respectively, a fresh bed of coal is substituted for a former filter bed in the remaining bed to await utilization as an adsorption bed in the next cycle of operation.

References Cited

UNITED STATES PATENTS

| | | | |
|---|---|---|---|
| 3,244,621 | 4/1956 | Bouthilet | 210—40 |
| 3,171,804 | 3/1965 | Rice | 210—53 |
| 297,363 | 4/1884 | Farquhar et al. | 210—272 |
| 1,574,557 | 2/1926 | Coe | 210—272 |
| 3,300,403 | 1/1967 | Kehoe | 210—51 X |

OTHER REFERENCES

Metcalf, L., et al.: American Sewerage Practice, vol. III, Disposal of Sewage, 1935, Third edition, McGraw-Hill, N.Y., pp. 456–466.

Summary Report I (of record), Additional pp. 2–5.

Summary Report I, The Advanced Waste Treatment Research Program, June 1960–December 1961, U.S. Dept. of H.E.W., Public Health Service, Robert A. Taft Sanitary Engineering Center, Cincinnati, Ohio., May 1962, pp. 6–9, 17–20, 57 and 58 relied on.

Summary Report, January 1962–June 1964, rest of citation same as above, April 1965, pp. 14–25 relied on.

MICHAEL E. ROGERS, *Primary Examiner.*